J. F. LEVERING.
MACHINE FOR TREATING COTTON.
APPLICATION FILED NOV. 12, 1919. RENEWED JULY 22, 1921.
1,394,775.
Patented Oct. 25, 1921.
3 SHEETS—SHEET 2.
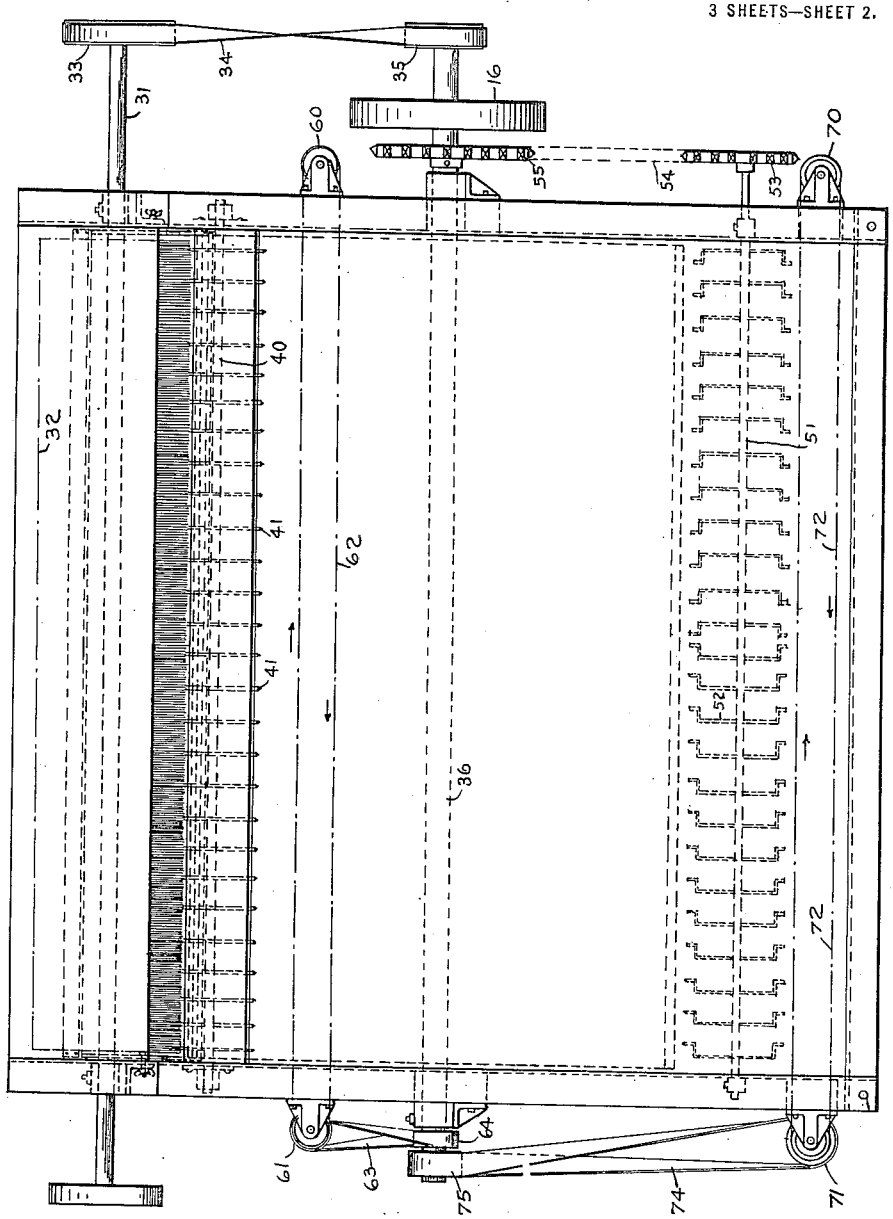
INVENTOR:
James Franklin Levering
BY
Edmond Cougan Brown
ATTORNEY.

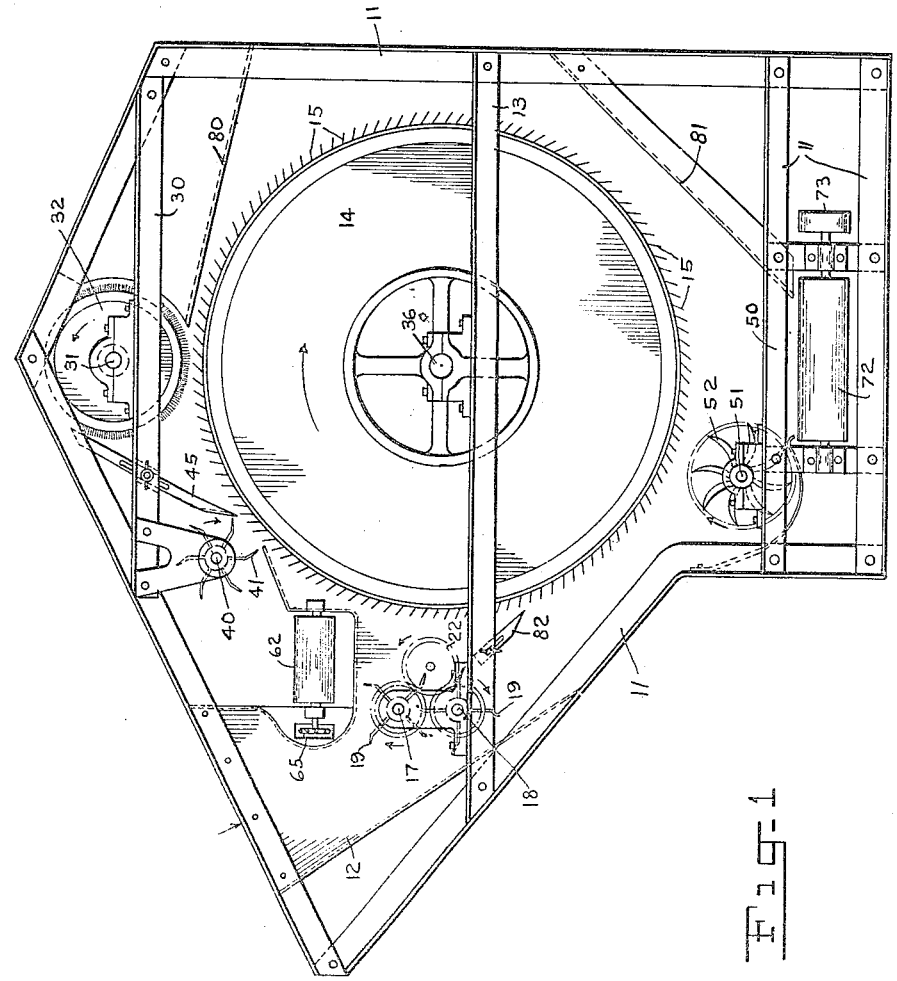

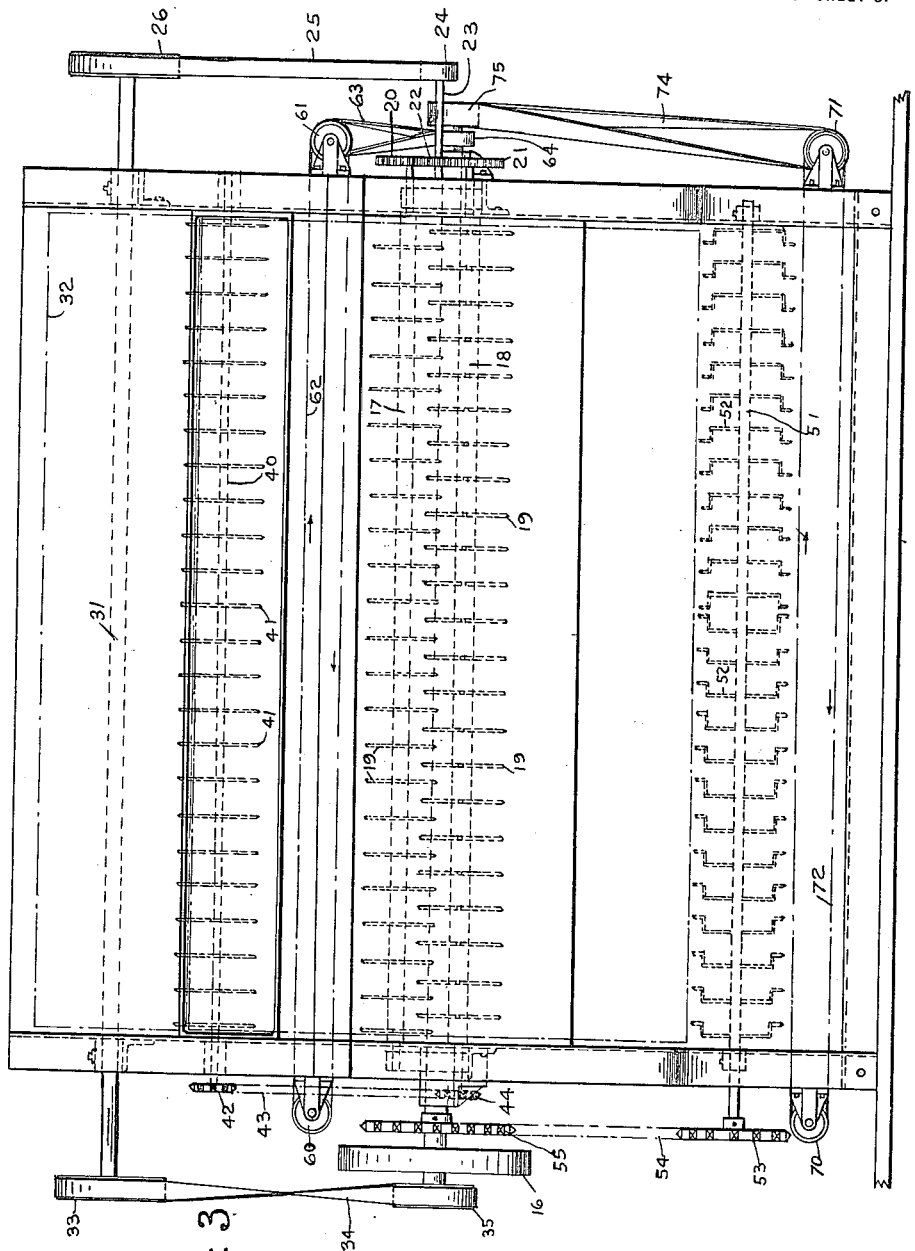

UNITED STATES PATENT OFFICE.

JAMES FRANKLIN LEVERING, OF ATLANTIC CITY, NEW JERSEY, ASSIGNOR TO STANDARD COTTON COMPANY OF AMERICA, A CORPORATION OF DELAWARE.

MACHINE FOR TREATING COTTON.

1,394,775.  Specification of Letters Patent.  Patented Oct. 25, 1921.

Application filed November 12, 1919, Serial No. 337,390. Renewed July 22, 1921. Serial No. 486,805.

*To all whom it may concern:*

Be it known that I, JAMES FRANKLIN LEVERING, a citizen of the United States, and a resident of Atlantic City, in the county of Atlantic and State of New Jersey, have invented certain new and useful Improvements in Machines for Treating Cotton, of which the following is a specification.

In the culture of cotton the usual practice is to allow the bolls to mature upon the plant until the hull bursts open and the seed cotton protrudes, whereupon the latter is picked by hand and treated in the gin for the purpose of removing the seeds. It sometimes happens, however, that by reason of an early frost or from some other cause a portion of the crop fails to mature, and the boll does not open so as to permit the seed cotton to be extracted therefrom. These frost-bitten or immature bolls are not only a loss to the grower, but are dangerous because if left in the fields they are apt to harbor boll-weevil. It has been found, however, that if these frost-bitten or immature bolls are artificially dried out and matured, they will open and the cotton fibers within will be fluffed out, and cotton bolls are thus sometimes treated in a drying machine which is already known in the art.

It is also known in the art that such immature or frost-bitten cotton bolls are much benefited by being treated, before being subjected to the drying operation, in such a way as to crack the bolls, as by so doing a means of escape is provided for the dampness in the interior of the boll when the same is passed through the drier, thus preventing the fiber from being injured by the heated moisture which would otherwise be confined in the boll, and I am aware of the patent to James Carlton Patterson, No. 1,259,661, granted March 19, 1918, for a process and apparatus for treating frost-bitten or immature cotton bolls.

There has been a serious disadvantage, however, in handling such immature or frost-bitten cotton bolls, even when treated by the Patterson process and apparatus above referred to before drying the same, in that it has been found extremely difficult to thoroughly or easily remove the dried hulls from the seed cotton after the bolls are delivered from the drier. In the culture of cotton under normal conditions, as above explained, the seed cotton is plucked by hand from the hull, as it stands in the field, and requires little cleaning to separate it from any small fragments of hull which may be plucked with the cotton, but in the case of a boll which has been cracked and then passed through a drier, the conditions are very different from those which obtain in the field, as will readily be understood. So far as I am aware it has not been possible heretofore to provide any apparatus or machinery capable of satisfactorily removing the dried fragments of hull from the seed cotton, and it has therefore been necessary to effect the cleaning of the seed cotton by hand, which is very difficult and occupies much more time than is the case when the seed cotton is merly plucked out of the undried and comparatively unbroken hull in the cotton field.

The object of my invention is to provide means for treating cotton bolls so as to remove the hull from the seed cotton.

The invention consists in the novel construction, arrangement and combination of various devices, elements and parts, as hereinafter set forth in the claims hereof, one embodiment of the same being shown in the accompanying drawings and fully described in this specification.

In the said drawings, Figure 1 is a side view of an apparatus embodying one form of my invention, the outer casing being removed; Fig. 2 is a back view, and Fig. 3 a front view of the same.

In carrying my invention into effect in the embodiment thereof which I have selected for illustration in the accompanying drawings and description in this specification I provide a suitable framework or skeleton made up of various members, as 11, which may be angle irons or the like, and which serve to support the various part of the machine. It will of course be understood that the apparatus may be inclosed in a suitable outer casing, which, however, forms no essential part of my invention and which is not shown in the drawings.

Referring now more particularly to Fig. 1 it will be seen that at the front of the machine a hopper 12 is provided into which the cotton bolls are introduced, which, as they pass through the apparatus, are acted upon by the mechanism now to be described. It is understood that the cotton bolls introduced into the apparatus may be immature bolls, which have not normally opened in the field, but which have been subjected to treatment by cracking the bolls and drying out the moisture contained therein so that the hulls have become more or less brittle and the seed cotton fluffed out. At each side of the machine is a member 13 extending from front to rear, upon which is suitably journaled a drum 14 provided with peripheral fingers or pins 15. The shaft 36 of the drum projects outside of the apparatus at each end, and bears at one end a pulley 16, which constitutes the main drive of the apparatus. The drum is preferably hollow, with partly closed ends.

On said members 13 are also journaled shafts 17 and 18 each of which bears a number of agitators 19. The ends of these shafts project outside of the machine at one side and bear gear wheels 20 and 21 respectively (see Fig. 3). Journaled outside of the machine is a gear wheel 22, which engages with the gear wheels 20 and 21 and from which extends laterally a shaft 23 bearing at its outer end a pulley 24 from which a belt 25 extends upward to the pulley 26, by means of which the shafts 17 and 18 and the agitators thereon are driven.

Located above the members 13, and on each side of the machine, are similar supporting members 30 (see Fig. 1). On these members is journaled a shaft 31 (see Fig. 3), which bears a cylindrical brush 32 (see Fig. 1). The said shaft 31 bears at its left-hand end a pulley 33 upon which runs a crossed belt 34 which also passes over the pulley 35 on the end of the shaft 36, which is the main drive shaft of the apparatus. The other end of the shaft 31 bears the pulley 26, already referred to, which by means of the belt 25 communicates motion to the agitators.

Also journaled on said supporting members 30 (see particularly Fig. 1) is a shaft 40 bearing a number of agitators 41. This shaft is driven by a sprocket 42 (see Fig. 3) which engages with a sprocket-chain 43 which passes down and engages with a sprocket 44 on the left-hand end of shaft 18.

Adjustably secured between said supporting members 30 is a knife 45 (see Fig. 1), the lower end of which normally approximates nearly to the ends of the agitators 41 just above described and also to the pins or fingers 15 on the drum 14, as shown in Fig. 1.

At the lower part of the machine, on each side, are located supporting members 50 (see Fig. 1) and in these is journaled a shaft 51 bearing a series of fingers 52 (see Figs. 2 and 3). The shaft 51 is driven by a sprocket 53 which engages with a sprocket-chain 54 which is driven by a sprocket 55 on the main drive shaft 36.

On the outside of the machine, somewhat above its middle portion, are journaled rollers 60 and 61, one on each side (see Figs. 2 and 3) and over these rollers passes an endless belt or apron 62 (see also Fig. 1). This apron is operated by means of a pulley 65 on the end of the shaft 61, over which passes a belt 63 which is driven by a pulley 64 on the main drive shaft 36.

At the lower part of the machine, one on each side, are journaled rollers 70 and 71, which bear an endless belt or apron 72 (see Fig. 1). This apron is driven by means of a pulley 73 on the end of the shaft of the roller 71, over which passes a belt 74, which is driven by a pulley 75 on the main drive shaft 36.

In the upper part of the machine and extending rearwardly from the location of the cylindrical doffer-brush 32 is a chute 80 which discharges through the opening in the rear of the machine.

In the lower part of the machine, toward the rear, is a slantingly disposed baffle plate 81, which leads to the conveyer-apron 72.

On the supporting members 13 is adjustably secured a scraper-knife 82, the lower edge of which is normally in approximation to the fingers 15 on the drum 14.

The operation of my invention is as follows: The cotton bolls, the hulls of which may have previously been cracked and the whole boll more or less dried out as hereinbefore described, are deposited in the hopper 12 and are immediately acted upon by the agitators 19, which separate the fragments of hull and other debris and allow the same to drop down upon the traveling apron 72 which discharges them out at the side of the machine; the seed cotton on the other hand is thrown by the agitators 19 against the drum 14, the fingers of which engage the same and carry it around. As the seed cotton is carried upward by the drum 14, and as it passes by the adjustable knife 45, any remaining fragments of hull or other debris are scraped off by the said knife and are taken up by the fingers 41 on the shaft 40 and deposited on the conveyer-apron 62 by which the same are discharged out at the side of the machine. The seed cotton is, however, carried on around by the rotating drum until it reaches the cylindrical doffer-brush 32, which is rotating at a considerably higher rate of speed than the drum, and the pins of which sweep the seed cotton off from the fingers of the drum 14 and deposit the same on the floor of the chute 80 by which it is carried out of the apparatus.

Any seed cotton, as well as any fragments of hulls or other debris which may not be removed from the fingers 15 of the drum 14 by means of the doffer-brush 32, are of course carried on by the rotation of the drum and pass down and then up again on the front of the machine. During such upward motion any remaining debris attached to the seed cotton is scraped off by the adjustable knife 82 and falls down upon the conveyer-apron 72 and is discharged out at the side of the machine, while the seed cotton passes on up to be acted on by the doffer-brush 32.

Any seed cotton which may happen not to be thrown by the agitators 19 against the fingers of the drum 14, passes downward and falls upon the fingers of the shaft 51, which, rotating at a considerable speed, throw the seed cotton up toward the drum 14 so that it is caught by the fingers 15 and passes around to be acted upon by the knife 45 and doffer-brush 32 in the manner already described.

The advantages of my invention will be obvious from what has been above set forth with regard to the construction and mode of operation of the apparatus. I have found in practice that not only is my apparatus capable of treating frost-bitten cotton bolls which have been overtaken in the field by cold weather so that the bolls have failed to open, and which have been gathered, cracked, and dried and fluffed out as hereinabove described, but also that the apparatus may with great advantage be employed in connection with the treatment of cotton bolls other than those which have been frosted, that is to say, by gathering the bolls when they are practically ripe but not yet thoroughly sundried and cracked open, and treating such bolls in the manner already fully described, and then subjecting the same to the operation of my machine; and I have found that the cotton fiber produced in this way is superior to cotton which has been allowed to ripen in the field and which has therefore necessarily been subjected to all the vicissitudes of weather and climate between the time that the fiber has matured and the time that the boll has burst open and the seed cotton fluffed out; in other words by the use of my apparatus I am enabled to not only anticipate the usual time of cotton harvest very considerably, by picking unopened bolls and treating them as above described, but furthermore I produce thereby a much better quality of cotton fiber.

I do not limit myself to the exact details of construction of my apparatus which I have shown and described, as it is obvious that various modifications in the form and construction of the same can be made without departing from the spirit and scope of the invention.

Having thus described my invention, what I claim as new and desire to secure by Letters Patent is as follows:

1. A machine for treating cotton comprising in combination a supporting frame and movable devices supported thereby adapted to operate upon the cotton, comprising agitators adapted to break the hull of the cotton boll and transfer the same onward into the apparatus, a rotating drum provided with fingers adapted to receive same and carry same onward, a knife adapted to scrape the fragments of hull and trash from the cotton as the same is carried onward by said rotating drum, rotating fingers adapted to take up said trash, a traveling apron adapted to receive said trash and convey the same out of the apparatus, a doffer brush adapted to remove said cotton from said rotating drum, means adapted to convey said cotton out of the apparatus, and means adapted to operate said movable parts.

2. A machine for treating cotton comprising in combination a supporting frame and movable devices supported thereby adapted to operate upon the cotton, comprising agitators adapted to break the hull of the cotton boll and transfer the same onward into the apparatus, a rotating drum provided with fingers adapted to receive same and carry same onward, a knife adapted to scrape the fragments of hull and trash from the cotton as the same is carried onward by said rotating drum, rotating fingers adapted to take up said trash, a traveling apron adapted to receive said trash and convey the same out of the apparatus, a doffer brush moving at a greater speed than said rotating drum adapted to remove said cotton from said rotating drum, means adapted to convey said cotton out of the apparatus, and means adapted to operate said movable parts.

3. A machine for treating cotton comprising in combination a supporting frame and movable devices supported thereby adapted to operate upon the cotton, comprising agitators adapted to break the hull of the cotton boll and transfer the same onward into the apparatus, a rotating drum provided with fingers adapted to receive same and carry same onward, a knife adapted to scrape the fragments of hull and trash from the cotton as the same is carried onward by said rotating drum, rotating fingers adapted to take up said trash, a traveling apron adapted to receive said trash and convey the same out of the apparatus, a doffer brush adapted to remove said cotton from said rotating drum, a second knife adapted to remove from said rotating drum any trash which may have not been removed by said first named knife, means adapted to convey said cotton out of the apparatus, and means adapted to operate said movable parts.

Signed at Memphis, in the county of Shelby and State of Tennessee, this 5th day of November, 1919.

JAMES FRANKLIN LEVERING.